United States Patent
Dieckmann et al.

(10) Patent No.: US 6,790,547 B2
(45) Date of Patent: Sep. 14, 2004

(54) PROCESS FOR REDUCING COKE FORMATION IN HYDROCARBON PROCESSING BY APPLICATION OF RADIO FREQUENCY ELECTROMAGNETIC RADIATION UTILITY

(75) Inventors: Gunther H. Dieckmann, Walnut Creek, CA (US); Michael E. Moir, San Rafael, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 251 days.

(21) Appl. No.: 09/970,179

(22) Filed: Sep. 27, 2001

(65) Prior Publication Data

US 2002/0045076 A1 Apr. 18, 2002

Related U.S. Application Data

(60) Provisional application No. 60/237,298, filed on Oct. 2, 2000.

(51) Int. Cl.$^7$ .......................... H01M 8/06; C10G 9/12; C01B 3/02
(52) U.S. Cl. ............................ 429/17; 429/12; 429/13; 585/950; 208/482; 423/460
(58) Field of Search ......................... 429/12, 17, 13, 429/218.1; 585/950; 208/48 R; 423/460; 252/62.2; 219/390, 405, 411; 392/416, 118; 118/724; 250/492.1

(56) References Cited

U.S. PATENT DOCUMENTS

| | | | | |
|---|---|---|---|---|
| 3,655,481 A | * | 4/1972 | Hall .......................... 156/273.5 |
| 4,365,006 A | | 12/1982 | Baker .......................... 429/17 |
| 4,658,634 A | | 4/1987 | Killough et al. .................. 73/3 |
| 4,830,834 A | | 5/1989 | Stahl et al. .................. 422/190 |
| 4,841,925 A | * | 6/1989 | Ward ...................... 123/143 B |
| 4,895,457 A | * | 1/1990 | Lancaster et al. ............. 383/94 |
| 5,149,464 A | | 9/1992 | Green et al. ................. 252/373 |
| 5,346,779 A | | 9/1994 | Nakazawa .................... 429/19 |
| 5,413,700 A | | 5/1995 | Heyse et al. ................. 208/134 |
| 5,486,313 A | | 1/1996 | De Jong et al. ............. 252/373 |
| 5,527,632 A | | 6/1996 | Gardner ....................... 429/27 |
| 5,593,571 A | | 1/1997 | Heyse et al. ................. 208/134 |
| 5,676,821 A | | 10/1997 | Heyse et al. ................. 208/135 |
| 5,748,868 A | | 5/1998 | Echigo et al. ............... 395/133 |
| 5,863,418 A | | 1/1999 | Heyse et al. ................. 208/135 |
| 5,866,743 A | | 2/1999 | Heyse et al. ................. 585/486 |
| 5,932,141 A | | 8/1999 | Rostrop-Nielsen et al. . 252/373 |
| 6,019,943 A | | 2/2000 | Buscemi et al. ............... 422/8 |
| 6,077,629 A | | 6/2000 | Parker et al. .................. 430/1 |
| 6,083,425 A | | 7/2000 | Clawson et al. ............ 252/372 |
| 6,085,512 A | | 7/2000 | Agee et al. ................ 60/39.02 |
| 6,123,913 A | | 9/2000 | Clawson et al. ............ 423/652 |
| 6,423,953 B1 | * | 7/2002 | Johnson, Jr. ................. 219/634 |
| 6,699,450 B2 | * | 3/2004 | Dunn et al. ................. 423/291 |

FOREIGN PATENT DOCUMENTS

| | | |
|---|---|---|
| WO | WO 99/48805 | 3/1998 |
| WO | WO 99/29249 | 11/1998 |

OTHER PUBLICATIONS

Yongdan Li et al., "Simultaneous Production of Hydrogen and Nanocarbon from Decomposition of Methane on a Nickel–Based Catalyst" Energy & Fuels, vol. 14, pp. 1118–1194 (2000).

A.K.M. Fazie Kibria et al., "Synthesis of carbon nanotubes over nickel–iron catalysts supported on alumina under controlled conditions", Catalysis Letters, vol. 71 (3–4) pp. 225–228 (2001).

G. Roussy et al, Section 3.2 "Radio Frequency Generators", Foundations and Industrial Applications of Microwaves and Radio Frequency Fields, John Wiley 7 Sons Ltd., pp. 87–98, (1995).

* cited by examiner

Primary Examiner—Bruce F. Bell
Assistant Examiner—Monique Wills
(74) Attorney, Agent, or Firm—D. M. Tuck

(57) ABSTRACT

The present invention provides a process for suppressing the formation of metal-containing coke during processing of a hydrocarbonaceous material, such as for example a hydrocarbon conversion processes. Electromagnetic radiation is applied to the hydrocarbonaceous material while heating the hydrocarbonaceous material to a temperature above 700 degrees F. The frequency of the electromagnetic radiation is preferably below 300 MHz. The process is particularly useful in the reforming of a hydrocarbon material for operation in a fuel cell.

29 Claims, 1 Drawing Sheet

Effect of RF on the hydrogen yield after water gas shift
as a function of time.
Autothermal reforming of toluene over a
nickel based catalyst at 1300 F.

Feed rate: 2.115 ml toluene/hr  LHSV 1.18 hr-1
Water rate: 8.03 gm/hr  $H_2O$ to C mole ratio: 3.21
Air rate: 100 ml/min  O to C mole ratio: 0.74
Theoretical $H_2$ yield after water gas shift: 104 ml/min $$C_7H_8 + 2.57\ O_2 + 1.85\ H_2O \longrightarrow 7\ CO + 5.85\ H_2$$

PROCESS FOR REDUCING COKE FORMATION IN HYDROCARBON PROCESSING BY APPLICATION OF RADIO FREQUENCY ELECTROMAGNETIC RADIATION UTILITY

This application claims the benefit of Provisional Application No. 60/237,298 filed Oct. 2, 2000.

FIELD OF THE INVENTION

The present invention relates to a process for reducing coke formation in organic compound conversion processes.

BACKGROUND OF THE INVENTION

Fouling of catalysts and/or process equipment by coke is a major problem in high temperature organic compound conversion processes. Coke can cover active catalyst sites and plug catalyst pores, thereby reducing activity. In process equipment, it can build up on furnace tubes and reactors leading to heat transfer and pressure drop problems. Coking in some cases can be so severe as to completely plug the process with coke. While there are many methods of controlling coking such as careful selection of catalysts and plant metallurgy, application of low coking coatings, and/or the addition of steam or sulfur, coking still remains a major problem. Application of low coking coatings, often referred to as Metal Protection Technology (MPT) is taught in U.S. Pat. Nos. 5,866,743; 5,849,969; 6,019,943; 5,676,821; 5,593,571; 5,863,418; and 5,413,700 all of which are incorporated herein by reference. In some processes such as delayed coking or flexi-coking, coke is a by-product of the process that has a very low value. Clearly any method that can reduce the amount of coke formed would be very beneficial. The present invention provides such a method that can be used to minimize coking in a wide variety of processes and applications.

SUMMARY OF THE INVENTION

The present invention provides a process for reducing coke formation in organic compound conversion processes by the application of radio frequency electromagnetic radiation.

One embodiment of the present invention describes a process for suppressing the formation of coke during processing of a carbonaceous or organic material, comprising: applying electromagnetic radiation with a frequency below 300 MHz to the carbonaceous or organic material while heating said material to a temperature above 700° F.

Another embodiment of the present invention involves a process for suppressing the formation of metal-containing coke on a catalyst which contains a coke forming metal, the process comprising applying electromagnetic radiation with a frequency below 300 MHz to a reaction chamber which contains a catalyst comprising a metal selected from the group consisting of Mn, Fe, Ru, Os, Co, Rh, Ir, Ni, Pd, Pt, and Cu, in contact with a carbonaceous or organic material at conditions suitable for converting the carbonaceous or organic material, to form a stream comprising hydrogen.

The present invention also describes a method for operating a fuel cell comprising:
contacting a carbonaceous or organic material in the presence of electromagnetic radiation having a frequency below 300 MHz with a catalyst at conditions suitable for reforming the hydrocarbonacous material to form a stream comprising hydrogen; and
converting at least a portion of the stream comprising hydrogen in a fuel cell to produce an electrical current.

In an alternative embodiment of the present invention a process for improving the properties of carbonaceous materials made by metal catalyzed processes above a temperature of 700 degrees F. by application of electromagnetic radiation to said process with a frequency of below 300 MHz is described.

Among other factors we have surprisingly discovered that application of electromagnetic radiation with a frequency of less than 300 MHz, and more preferably less than about 50 MHz with an electric field strength less than 5000 V/cm and more preferably less than about 1000 V/cm will suppress coking in high temperature organic containing compound conversion processes. In a preferred embodiment of the present invention, this technology suppresses metal catalyzed coking in high temperature hydrocarbon conversion processes, as well as in any high temperature process that utilizes, converts, or produces CO and/or $CO_2$ where metal catalyzed coking is a problem. We have also surprisingly discovered that the application of electromagnetic radiation with a frequency of less than 300 MHz, and more preferably less than about 50 MHz with a field strength less than about 5000 V/cm and more preferably less than about 1000 V/cm will reduce the amount of coke formed in delayed cokers, flexi-cokers and resid fluidized-bed catalytic crackers. Furthermore this process can be used in conjunction with any of the other coke suppression technologies taught in the arts.

We have also surprisingly discovered that application of electromagnetic radiation with a frequency of less than 300 MHz, and more preferably less than about 50 MHz with an electric field strength less than 5000 V/cm and more preferably less than about 1000 V/cm can be used to alter or improve the properties of carbonaceous materials made by metal catalyzed processes.

DETAILED DESCRIPTION OF THE INVENTION

Figure 1:
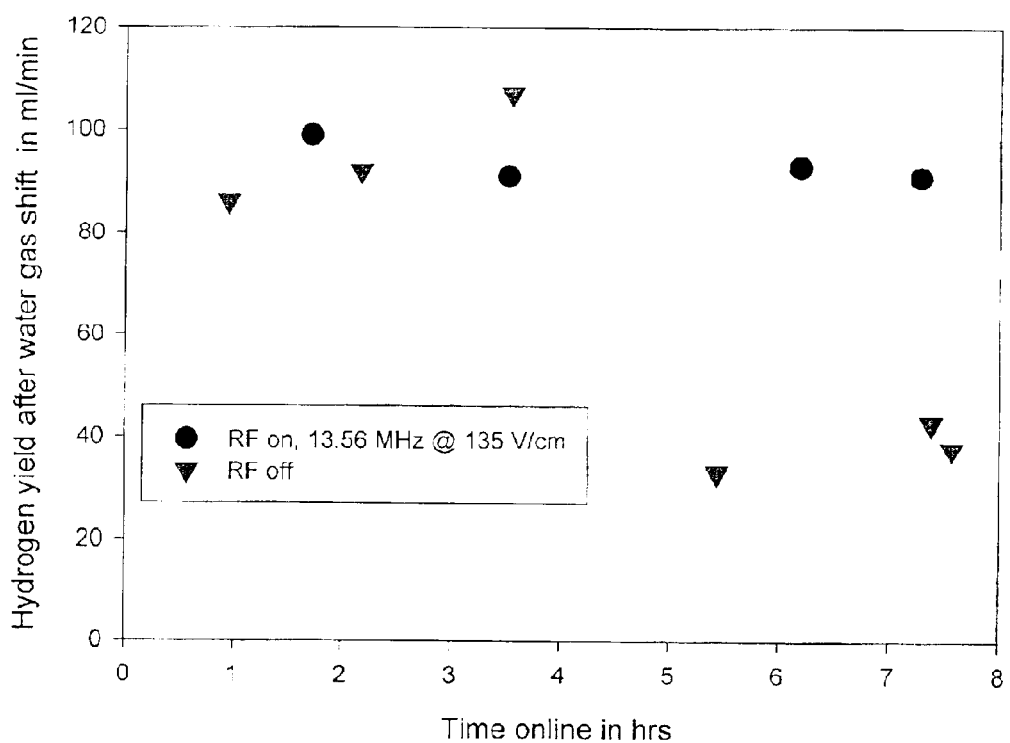
FIG. 1 is a graph showing the effect of a radio frequency electromagnetic field on hydrogen yield as a function of time in the autothermal reforming of toluene over a Ni based catalyst at 1300 degrees F. as discussed in Example 5 of this application. The RADIO FREQUENCY field used is 13.56 MHz@135V/cm.

The process of the present invention can be particularly effective in reducing metal catalyzed coking in any high temperature process in excess of about 700° F. that utilizes, converts, or produces, carbonaceous, or organic containing compounds. An organic containing compound is any compound that contains the elements carbon and hydrogen, but may also include heteroatoms such as nitrogen, oxygen, sulfur, phosphorous, nickel, vanadium, and/or any halides. Thus organic containing compounds include but are not limited to all hydrocarbons, alcohols, aldehydes, ketones, carboxylic acids, amines, organometallic compounds, alkyl halides, thiols, and sulfides. Carbonaceous compounds are those compounds that contain carbon including all organic compounds as well as carbon monoxide and carbon dioxide.

The process of the present invention is particularly useful in high temperature hydrocarbon conversion processes. Hydrocarbon conversion processes are processes that use, alter, or produce hydrocarbon compounds even in minute amounts. This includes but is not limited to all refinery and petrochemical processes such as hydrocracking, hydrofinishing, isomerization, reforming, delayed coking, flexi-coking, fluid catalytic cracking, resid fluidized catalytic cracking, ethylene steam cracking, dehydrogenation, dehydrogenation over ion conducting membranes, catalytic dehydroalkylation, thermal dehydroalkylation, MTG (methanol to gasoline), MTO (methanol to olefins), etc. Other process that use hydrocarbons where this process of RADIO FREQUENCY coke suppression is useful includes, but is not limited to: steam reforming, partial oxidative reforming and autothermal reforming of methane and higher hydrocarbons to hydrogen and CO and/or $CO_2$. Radio frequency coke suppression is also useful in reducing metal catalyzed coking in processes that utilize, convert, or produce CO and/or $CO_2$. Thus this process is useful in maintaining activity of catalysts used in the partial oxidation or autothermal reforming of methanol, ethanol, gasoline, diesel, or other hydrocarbon based fuel into hydrogen and carbon monoxide. This technology may also be useful in reducing coking on metal containing catalysts and on the process equipment in autothermal reformers and ion transport membrane partial oxidative reformers for the conversion of natural gas and other hydrocarbons into carbon monoxide and hydrogen. Autothermal reforming is a combination of partial oxidation and steam reforming where the exothermic heat of the partial oxidation supplies the necessary heat for the endothermic steam reforming reaction. Synthesis gas production and autothermal reforming are discussed in U.S. Pat. Nos. 6,085,512, 5,932,141, 4,830,834, 5,486,313, 6,083,425, 6,123,913 and 5,149,464 as well as PCT Publications WO 99129249 A1 and WO 99/48805 A1 which are incorporated herein in their entirety.

We also have found that application of radio frequency electromagnetic radiation can be used to alter or improve the morphology or properties of carbonaceous materials made by metal catalyzed processes. For example, Yongdan Li, Jiuling Chen, Yongning Qin, and Liu Chang in Energy & Fuels vol. 14, pages 1188–1194, 2000 teach that methane can be decomposed over nickel and nickel/copper catalysts to form hydrogen and carbon nanotubes. A. K. M. Fazle Kibria, Y. H. Mo and K. S. Nahm in Catalysis Letters, vol 71(3–4), pages 229–236, 2001 produced carbon nanotubes from acetylene over an iron/nickel catalyst. B. C. Liu, L. Z. Gao, Q. Liang, S. H. Tang, M. Z. Qu, and Z. L. Yu in Catalysis Letters, vol 71(3–4), pages 225–228, 2001 found that carbon nanotubes can be prepared from methane or acetylene over a lanthanum cobalt catalyst. They also found that their samples were slightly contaminated with amorphous coke, which is not desirable, since ordinary metal catalyzed coke lacks the high tensile strength of carbon nanotubes. We have found that application of radio frequency radiation can be used to reduce the concentration of undesirable amorphous or ordinary coke in the above processes, while not interfering with formation of carbon nanotubes.

The applied electromagnetic radiation in the process of the present invention may be sinusoidal in form, but may also take on other forms including square wave, triangular wave, or superposition of multiple periodic waveforms including combinations of different frequencies or pulses. Means of generating such electromagnetic radiation, include, but are not limited to vacuum tubes, solid state power transistors, spark gap oscillators, Hartley oscillators, tuned-plate tuned-grid oscillators, or any other means known in the art. A description of the art can be found in textbooks on the subject, such as "FOUNDATIONS AND INDUSTRIAL APPLICATIONS OF MICROWAVES AND RADIO FREQUENCY FIELDS" by G. Roussy and J. A. Pearce, 1995, published by John Wiley & Sons Ltd. The electromagnetic field may be applied to the system by means of electrode plates, wires or grids. These plates, wires or grids may or may not be insulated. It is also possible to apply the field via an antenna or series of antennas.

In the process of the present invention it is very important to limit both the frequency and the field strength of the applied electromagnetic radiation in order to avoid conditions that may result in excessive heating, thermal runaways, the generation of hot spots, and/or the formation of plasmas. Coke is a very effective absorber of electromagnetic radiation in the radio and microwave regions of the electromagnetic spectrum, and the electrical conductivity of coke increases rapidly with increasing temperature. This can easily lead to thermal runaway conditions if the frequency and field strengths are too high. Thus it is important to limit the frequency of the applied electromagnetic radiation to less than 300 MHz, preferably below 200 MHz, more preferably below 100 MHz and still more preferably to less than about 50 MHz, and to keep the field strength below 5000 V/cm, preferably below 4000 V/cm, more preferably below 3000 V/cm, even more preferably below 2000 V/cm and still more preferably below 1000 V/cm in order to avoid thermal runaways and/or the creation of localized hot spots that can actually enhance coking. Clearly if a high frequency field is used, it is then desirable to operate with as low an electric field strength as possible. Likewise, if a low frequency field is used, then the electric field strength can be increased. Generally, it is desirable to control the frequency and/or electric field strength to conditions that limit the temperature rise in the system to no more than 50° F. However the frequency and field strength must also be high enough that a noticeable coke suppression effect is seen. It is also extremely important not to allow the electric field strength to exceed the breakdown potential of the system, so as to avoid the formation of an electric arc or the generation of plasma, which may result in increased deposition of coke.

By metal catalyzed coking, we mean the metal catalyzed reaction of organic compounds, and in particular hydrocarbons to form coke or carbonaceous deposits at temperatures as low as about 700° F. These metals may reside on or in the catalyst, come from the process equipment, or exist in the feed itself such as Ni in residuum. Metals that can cause or catalyze a coking reaction include but are not limited to Mn, Fe, Ru, Os, Co, Rh, Ir, Ni, Pd, Pt, Cu, and their associated carbides.

Metal-containing coke generally contain greater than 1 ppm (w/w) metals as elemental metal. Typical metals are found in Groups VIIA and VIIIA of the periodic table. Preferred metals include nickel, iron, manganese, cobalt. The metals generally occur in the coke as tiny particulates, often only a few microns in diameter or smaller.

In the present application the term coke is referring to a carbon-rich carbonaceous material, generally with a C/H ratio>1. The term coke as used herein is meant to include the conventional meaning known in the art.

In a preferred embodiment of the present invention application of RF or radio frequency radiation can be also used to reduce coking in delayed cokers, flexi-cokers, FCC units and resid FCC units. We have surprisingly discovered that application of low power radio frequency radiation can dramatically reduce the amount of coke formed in a laboratory glass coker. While not wishing to be limited by theory, we now believe that a significant portion of the coke formed in a delayed coker, flexi-coker and resid FCC unit is due to metal catalyzed coking involving mainly, but not restricted to Ni and Fe residing in the residuum. Thus application of RF radiation suppresses the coking tendencies of these elements; thereby, dramatically decreasing the amount of coke formed in the process, while increasing the liquid yield.

This technology can also be used to reduce coking in furnace tubes and heat exchangers involved in the processing of organic containing compounds at temperatures above 700° F.

This technology may also be useful in reducing the tendency of crude to plug reservoir formations upon application of heat generated by any means known in the art, including electrical resistive heating, burning or combustion of the crude, or application of microwave or RF electromagnetic energy.

In the present invention the radio frequency radiation may be applied to the process by an electrode or antenna or any other suitable means. The electrode or antenna or other suitable means may be in direct contact with the process. For example the electrode or antenna or other suitable means for application of the RF radiation may be in direct contact with the carbonaceous or organic material or the catalyst (if any) or the reaction chamber. Alternatively the electrode, antenna, or other suitable means for application need not be in direct contact with the process.

A particularly preferred embodiment of the present invention is the use of RF coke suppression in an on-board reformer for a fuel cell, such as in a fuel cell powered motor vehicle. In this embodiment of the present invention an on-board reformer would be used to convert a carbonaceous material such as a hydrocarbon mixture, ethanol, or methanol at high temperature to form a stream comprising hydrogen. The hydrogen produced by the on-board reformer would then be used by the fuel cell to create energy to power the vehicle. The present invention comprising RF coke suppression will be desirable to minimize coking of the on-board reformer. On-board reformers can require on-board catalyst regeneration in order to, among other factors, reverse the effect of coke buildup on the catalyst. RF coke suppression can help to maintain catalyst activity, while minimizing the rate of coke buildup and thus minimizing the frequency of regenerations. This will lengthen the catalyst life and help minimize the downtime of the reformer/fuel cell unit. Particularly preferred catalysts that can be used in the on-board reformer comprise metals selected from the group consisting of Ni, Pt, Pd, Ru, Ir, and Rh and mixtures thereof. Fuel cell/Reformer systems that may be used in the process of the present invention are described in U.S. Pat. Nos. 5,527,632, 4,659,634, 4,365,006, 6,077,620, and 5,346,779 which are herein incorporated by reference.

EXAMPLES

The present examples are intended to help illustrate the process of the present invention and are not meant to limit the scope of the application.

Example 1

An iron containing perovskite catalyst was placed between the annulus of two concentric quartz tubes. A silver foil roll was then placed into the center quartz tube, and allowed to expand so that it touched the inner side of the inner quartz tube. This silver foil was then connected to the load of a 13.56 MHz power supply and a 46 V (rms) potential was established between the inner and outer electrodes. The outer quartz tube was also wrapped with silver foil. This foil was connected to ground. This apparatus was placed into a furnace, 40 ml/min of nitrogen gas was then flowed over the catalyst, the RF power supply was turned on, and then the furnace was heated to 1450° F. Benzene was then pumped over the catalyst at a rate of 6 ml/hour for 30 minutes. The electric field strength in this experiment was approximately 150 V/cm. At the end of 30 minutes nitrogen gas flowed through the catalyst bed unhampered.

The experiment was repeated again, except this time the RF field was turned off. After approximately 10 minutes the benzene and nitrogen could no longer flow through the catalyst bed. It was now plugged with coke.

This demonstrates that an electromagnetic field can suppress coking on a metal containing catalyst.

Example 2

A nickel wire (0.005" in diameter) was loosely wrapped around the outer diameter of inner quartz tube of the concentric quartz tube apparatus described in example 1. A 13.56 MHz RF field with a field strength of 250 V/cm (97 V rms) was applied. Benzene was then flowed over the nickel wire at 1300° F. for 1 hour. At the end of the experiment the outer silver foil was peeled back and only a few tufts of coke were seen attached to the wire. Otherwise the wire was bare and free of coke.

This same wire was then exposed to the same conditions of benzene at 1300° F. for an additional 1 hour. But this time the RF field was left off. The nickel wire was now evenly coated with a thick layer of coke.

Example 3

An iron wire 76 microns in diameter was wrapped around the inner quartz tube of the apparatus described in example 1. A 13.56 MHz RF field with a field strength of 240 V/cm (91.5 V rms) was applied to the system. This time hexane was passed over the wire at 1100° F. for 24 hours. With the RF field on, a relatively thin 20–40 microns thick coke layer formed on the wire.

The experiment was repeated again with a new iron wire. After 24 hours under hexane at 1100° F., a 200 to 500 microns coke layer had formed on the iron wire.

Examples 2 and 3 demonstrate that application of electromagnetic radiation can suppress coking on metal surfaces.

Example 4

A small glass delayed coker apparatus was set up that consisted of a 250 ml graduated cylinder that fit snuggly into a cylindrical heating mantle. A water-cooled condenser was used to collect the liquid at separate it from the gas. A ¼" quartz tube was placed down the center of the graduated cylinder, and a ⅛" stainless steel tube was inserted into the quartz tube. This stainless steel tube served as the load electrode and was electrically isolated from the rest of the system. Silver foil, which served the role as the ground electrode was wrapped around the outside of the graduated cylinder.

The graduated cylinder was then charged with 200 grams of Boscan crude oil, a 102 volt (rms) 13.56 MHz RF field was applied, and then the crude was heated to 1000° F. over 5 hour period and held at 1000° F. for 4 hours. At the end of the experiment, the amount of liquid and coke were weighed. The amount of gas produced was determined by difference. However since the coke in the RF experiment appeared to be very wet in appearance, the coke was stripped with hot nitrogen at 1000° F. for 1 hour to remove the high boiling trapped hydrocarbons, and correct for volatiles.

The experiment was then repeated 3 times (twice with the field off, once more with the field on). The averages of the RF on versus RF off results are shown below in Table 1.

TABLE 1

Impact of RF Radiation on Coke Formation, Liquid Product Yield, and Gas Yield in a Delayed Coker

|  | RF off | RF on |
| --- | --- | --- |
| Yield of Coke, wt % | 24.6 | 14.5 |
| Yield of Whole Liquid Product, wt % | 64.6 | 75.7 |
| Yield of Gas, wt % | 10.8 | 9.8 |
| Total, wt % | 100 | 100 |

Example 4 clearly shows that application of electromagnetic radiation can substantially decrease the amount of coke formed in a delayed coker. We also believe that application of RF radiation would be effective in reducing the amount of coke formed in a flexi-coker as well as in a FCC unit, and in particular a resid FCC unit. Furthermore, application of RF may also prevent plugging of crude oil reservoir formations that are being heated.

Example 5

An autothermal reformer was assembled for the conversion of hydrocarbons into hydrogen and carbon monoxide. The unit was built of quartz, and consisted of an inner and outer quartz tube. The inner quartz tube was closed on one end, and was half the length of the outer quartz tube. The inner quartz tube was then placed in the outer quartz tube to create a 3.4 mm space or annulus in which catalyst was loaded. A Nichrome wire coil was placed inside of the inner quartz tube, and was connected to the load of the RF power supply. A second Nichrome wire was wrapped around the outside of the outer quartz tube, and was connected to ground. The distance between the two wires was 7.4 mm. A quartz burner, consisting of two small concentric quartz tubes, was placed into the open "free" end of the outer quartz tube. In the inner burner tube a mixture of steam and hydrocarbon vapor was passed, while air flowed in the outer burner tube. These two streams then meet at a point roughly 3 cm above the sealed end of the inner quartz tube described above. The entire quartz apparatus was then vertically placed in a 3-zone furnace. Thus when this unit was operating, the hydrocarbon vapor undergoes partial combustion with air in the presence of steam to create combustion products. These products containing carbon monoxide, hydrogen, but also carbon dioxide, methane and heavier hydrocarbons then pass through the catalyst bed to increase the yield of hydrogen. When the catalyst cokes, the yield of hydrogen drops off with time.

To demonstrate the effectiveness of RF fields on preventing coking, toluene was reformed over a nickel-based catalyst at 1300° F. with an oxygen (as atomic oxygen) to carbon mole ratio of 0.74 and a steam ($H_2O$) to carbon (C) mole ratio of 3.2. In the presence of a 100 V (rms) 13.56 MHz RF field, the catalyst showed no loss of activity after running for more than 7 hours. In contrast, the catalyst without RF coke suppression deactivated after about 4 hours online. FIG. 1 shows the yield of hydrogen after a hypothetical water gas shift reaction as a function of time for both runs. Clearly, application of a RF field prevents catalyst deactivation in autothermal or partial oxidative reforming of hydrocarbons.

What is claimed is:

1. A coke suppression process for suppressing the formation of coke during processing of a carbonaceous or organic material, comprising: applying electromagnetic radiation with a frequency below 300 MHz to the carbonaceous or organic material while heating said material to a temperature above 700° F.

2. A coke suppression process for suppressing the formation of metal-containing coke on a catalyst which contains a coke forming metal, the process comprising applying electromagnetic radiation with a frequency below 300 MHz to a reaction chamber which contains a catalyst comprising a metal selected from the group consisting of Mn, Fe, Ru, Os, Co, Rh, Ir, Ni, Pd, Pt, and Cu, in contact with a carbonaceous or organic material at conditions suitable for converting the carbonaceous or organic material, to form a stream comprising hydrogen.

3. The process of claim 1 wherein said processing is a reforming process to produce an effluent comprising Hydrogen and at least one gas selected from the group consisting of CO and $CO_2$.

4. A method for operating a fuel cell comprising:
   a) contacting a carbonaceous or organic material in the presence of electromagnetic radiation having a frequency below 300 MHz with a catalyst at conditions suitable for reforming the hydrocarbonacous material to form a stream comprising hydrogen; and
   b) converting at least a portion of the stream comprising hydrogen in a fuel cell to produce an electrical current.

5. The process of claim 1 wherein the temperature is above 850 degrees F.

6. The process of claim 1 wherein the temperature is above 950 degrees F.

7. The process of claim 1 wherein the temperature is above 1000 degrees F.

8. The process of claim 3 wherein the temperature is above 850 degrees F.

9. The process of claim 3 wherein the temperature is above 950 degrees F.

10. The process of claim 3 wherein the temperature is above 1000 degrees F.

11. The process of claim 1 wherein the electromagnetic radiation has a field strength of below 5000 V/cm.

12. The process of claim 2 wherein the electromagnetic radiation has a field strength of below 5000 V/cm.

13. The process of claim 4 wherein the electromagnetic radiation has a field strength of below 5000 V/cm.

14. The process of claim 1 wherein the electromagnetic radiation has a field strength of below 1000 V/cm.

15. The process of claim 2 wherein the electromagnetic radiation has a field strength of below 1000 V/cm.

16. The process of claim 4 wherein the electromagnetic radiation has a field strength of below 1000 V/cm.

17. The process of claim 3 wherein said reforming process provides hydrogen to a fuel cell.

18. The process of claim 17 wherein said reforming process and said fuel cell are on-board a fuel cell powered vehicle.

19. The process of claim 2 wherein the stream comprising hydrogen provides hydrogen to a fuel cell.

20. The process of claim 3 wherein said reforming process comprises a catalyst comprising a metal selected from the group consisting of Ni, Pt, Ru, Ir, Rh, and Pd.

21. The process of claim 1 wherein the applied electromagnetic radiation is in the form of a sinusoidal, square wave, triangular wave, or a superposition of multiple periodic waveforms.

22. The process of claim 1 wherein said applied electromagnetic radiation is applied in a pulse or a series of pulses.

23. The process of claim 1 wherein the electromagnetic radiation is applied using an electrode or antenna which is not in direct contact with the carbonaceous or organic material.

24. The process of claim 2 wherein the electromagnetic radiation is applied using an electrode or antenna which is not in direct contact with the carbonaceous or organic material and is not in direct contact with the catalyst.

25. The process of claim 2 wherein the electromagnetic radiation is applied using an electrode or antenna which is not in direct contact with the reaction chamber.

26. The process of claim 1 wherein the electromagnetic radiation is applied using an electrode or antenna which is in direct contact with the carbonaceous or organic material.

27. The process of claim 2 wherein the electromagnetic radiation is applied using an electrode or antenna which is in direct contact with the reaction chamber.

28. The process of claim 2 wherein the electromagnetic radiation is applied using an electrode or antenna which is in direct contact with the catalyst.

29. The process of claim 2 wherein the electromagnetic radiation is applied using an electrode or antenna which is not in direct contact with the carbonaceous or organic material.

* * * * *